No. 653,534. Patented July 10, 1900.
J. E. SHEARER.
CARBURETER.
(Application filed Nov. 11, 1899.)
(No Model.)
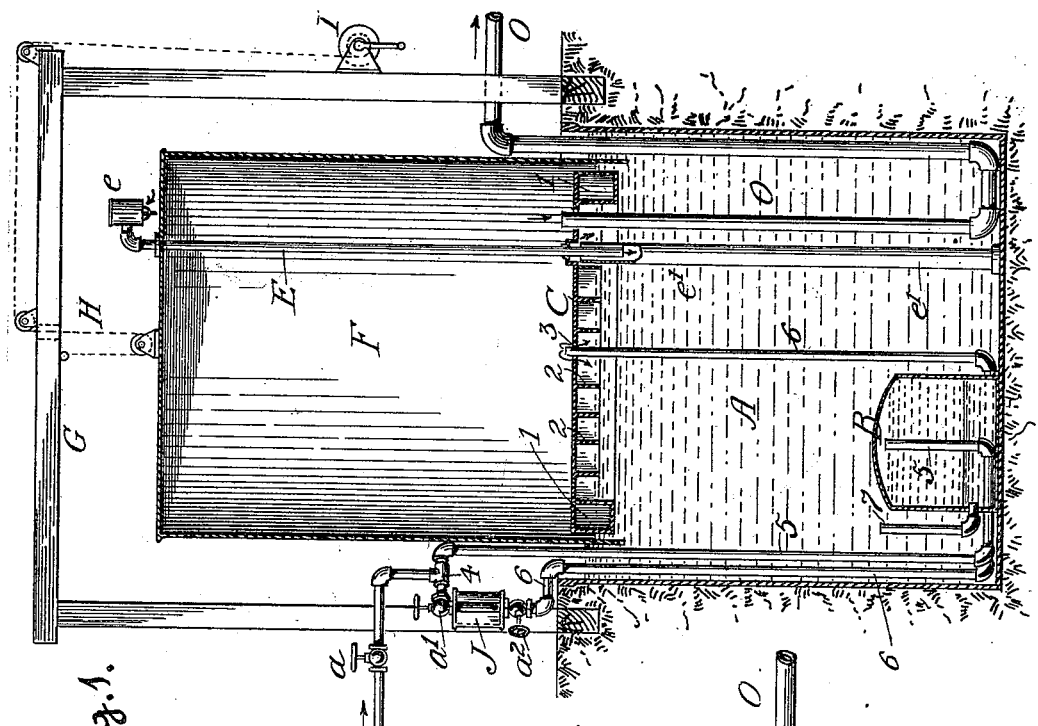
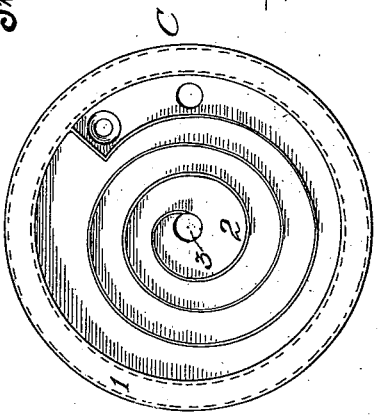
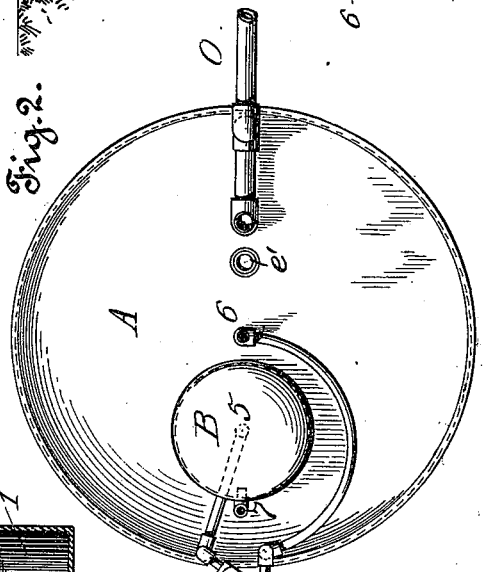
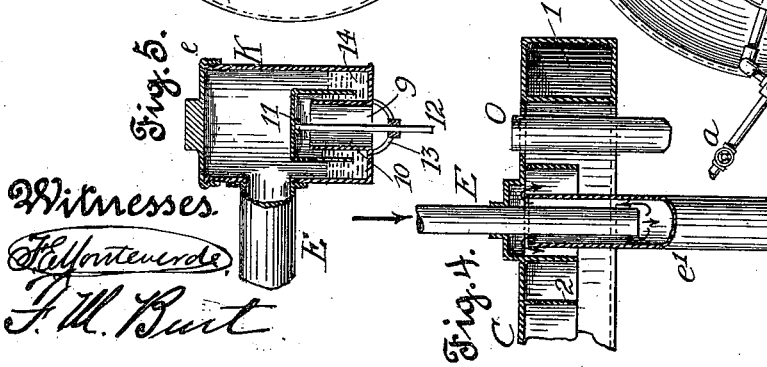
Witnesses
Inventor.
Joseph E. Shearer
by Spear Seely
Attorneys

UNITED STATES PATENT OFFICE.

JOSEPH E. SHEARER, OF CHICO, CALIFORNIA, ASSIGNOR TO JOHN C. BURDON, OF SAME PLACE, AND JOHN GLANVILLE, OF SACRAMENTO, CALIFORNIA.

CARBURETER.

SPECIFICATION forming part of Letters Patent No. 653,534, dated July 10, 1900.

Application filed November 11, 1899. Serial No. 736,609. (No model.)

*To all whom it may concern:*

Be it known that I, JOSEPH E. SHEARER, a citizen of the United States, residing at Chico, in the county of Butte and State of California, have invented certain new and useful Improvements in Gas-Machines or Carbureters, of which the following is a specification.

My invention relates to the manufacture of gas, and more particularly to an apparatus which I prefer to use in carrying out a process of carbureting air, described in an application for patent filed by me upon the same date as the present application and serially numbered 736,608.

The objects of my invention as embodied in apparatus are to provide a complete air-carbureting plant designed especially for private plants, for use in hotels, residences, factories, &c.; to make the plant of cheap and simple construction and operation, so that skilled operators are unnecessary nor chemical, scientific, or expert knowledge required in handling it; to make the plant absolutely safe when employing inflammable substances as carbureting agents; to furnish means for making regulated quantities of gas and to have those means under perfect control; to provide means for isolating a small and regulated quantity of carbureting material as the direct carbureting agent, so that the main supply is never exposed; to provide an improved carbureter of great capacity having special features of construction which facilitate the passage of air; to provide means for quickly emptying the gas-holder in case of necessity; to provide special and novel means for drawing air into the apparatus and by the operation of such means forming a gas-holding chamber.

All the objects are accomplished by the apparatus hereinafter described, and shown in the accompanying drawings.

In the drawings, Figure 1 is a vertical section of the whole apparatus. Fig. 2 is a top plan of the main tank, the carbureter and upper tank being removed. Fig. 3 is a bottom plan of the carbureter. Fig. 4 is an enlarged detail section to illustrate the relation of the air-inlet pipe to the carbureter. Fig. 5 is a detail vertical section of the air-inlet valve.

A represents the main tank, which is preferably buried in the ground and is filled with water. These features make a double precaution for the safety of the hydrocarbon-tank B, which is placed within tank A and rests upon its bottom, the tank B being first protected by the water in which it is immersed and also by the burial of tank A in the ground. The supply of gasolene or other hydrocarbon by which air is carbureted is only indirectly derived from this tank, and the carbureter is wholly disconnected from the main gasolene-supply in a manner which insures the absolute safety of the apparatus. I prefer to use gasolene as the carbureting agent, but do not limit myself to that substance.

The carbureter C floats on the surface of the body of water in tank A. Such floating carbureters have been employed before in cases where the main tank was filled with the carbureting agent. Such a construction is highly dangerous, as it calls for the practical disclosure of a large body of explosive fluid. I consider it a marked and special improvement to employ a body of water for submerging the gasolene-tank and also for supporting the carbureter. The carbureter which I prefer to use consists of a disk having a hollow rim 1, which forms an air-space and makes it buoyant. Secured to the disk on its lower side is a flange 2, of helical shape, which forms a continuous helical passage from the edge to the center. When the carbureter is in position, the edge of this flange dips into the water, so as to form a continuous water-sealed passage of the shape described and shown. The disk is provided with a central opening 3.

An inverted tank or bell F is supported from a suitable framing G by a rope or cable H, which extends to a windlass I, provided with an ordinary ratchet device for holding the bell in suspension. The bell is shown in elevated position in Fig. 1, which is the operative position, in which it acts as the gas-holder. Before commencing to make gas the bell is lowered into the main tank. Communicating with the interior of the gasolene-tank B is another open-ended pipe 7, into which water from the main body flows and fills the tank B. Gasolene is forced from any external source of supply through a pipe 5, which passes down inside the main tank and has an upturned open end within the inner tank B. This gasolene, entering under pressure, displaces the water in tank B, which is forced back into the main body of water through pipe 7, leaving the tank B wholly or partly full of gasolene. When the gasolene-pressure is cut off by the cock $a$, Fig. 1, the water-pressure is exerted upon the gasolene in tank B by water entering through pipe 7 and displacing the gasolene, which rises in pipe 5, and gasolene being about one-third lighter than water it will rise in pipe 5 to a height above the water-level equal to about one-third of the depth of water. Pipe 5 communicates, through a branch 4, provided with a cock $a'$, with the elevated measuring vessel J (preferably of glass) above the water-level and carbureter. This vessel holds a regulated quantity in proportion to the size of the plant, and this isolated quantity is the direct supply for the carbureter. From the vessel J a pipe 6 leads downwardly into the main tank and up through the body of water to the central opening 3 of the carbureter, which is larger than the upturned open end of said pipe 6. Pipe 6 has a cock $a^2$, which is closed while cock $a'$ is open. When the desired quantity of oil is in the vessel J, cock $a'$ is closed and cock $a^2$ opened. The gasolene will now feed by gravity through pipe 6, will escape at its upper end, and will fall through opening 3 into the passage of the carbureter, through which it spreads, resting in a thin body or stratum upon the water and leaving a clear passage above it. The absolute safety with which the supply, storage, and subsequent feeding of the inflammable material have been conducted and the isolation of the small quantity used in the carbureter will have been apparent to the reader. We now have a thin body of carbureting fluid resting on a body of water and forming the base of a continuous air-passage. I supply air and at the same time form a gas-holder by raising the inverted tank or bell which has been dipping in the water and is made air-tight. The act of raising the bell forms a vacuum above the water-level and carbureter, and the air to fill this vacuum is compelled to pass through the carbureter before entering the gas-holder.

E is an air-pipe passing air-tight into the bell and having an exterior air-valve $e$. Its lower end passes air-tight, Fig. 4, into the carbureter and enters a larger stationary tube $e'$ in the main tank, whose upturned end leaves a space for the escape of air into the air-passage of the carbureter. The tube $e'$ is of course necessary in order to permit air to be discharged at any height of the bell and at any point below the water-level. The pipe E and air-valve move with the bell. The air escaping from tube $e'$ enters the air-passage and is drawn through its whole length in contact with the body of gasolene. The air-pipe connects with this passage at its extreme outer end, Fig. 3, and hence the air follows the helical winding of the passage until at the central opening 3 and thoroughly carbureted it rises into the gas-holder. I consider the helical form of the air-passage of great advantage as compared to one of square or other angular shape as insuring a more rapid and easy passage of the air, there being no corners to produce obstructions.

The external air-valve $e$ has an important use besides that of admitting air. Its construction is shown in detail in Fig. 5. The casing K, to which the air-pipe E is coupled, has an opening 9 at the bottom, surrounded by an upturned flange 10, which forms a valve-seat. This is the air-inlet. Over this flange works valve 11, whose rod 12 projects through the opening 9, so that it can be operated from the outside, if desired, and is guided in a spider 13. Its normal operation is, however, automatic. A liquid seal 14 surrounds the flange and valve. When the vacuum is formed, as before described, the air rushing in lifts the valve and passes through the seal and into the air-pipe; but when the gas-holder is sufficiently filled and the bell is at rest, holding gas and ready to supply it, the valve reseats itself automatically, and any back pressure of gas through the air-pipe only tends to seat the valve more securely. At the same time, if it should be desired to empty the gas-holder quickly, as in case of a fire in the neighborhood, the valve can be opened from the outside and the gas in the holder will immediately escape through the carbureter, air-pipe, and air-inlet.

The gas-outlet pipe O is an open-ended pipe extending from the gas-holder through the carbureter down into the main tank and then upwardly, as shown, whence it leads to the lighting system. This arrangement of the outlet gas-pipe prevents any interference with the movable bell or gas-holder.

There are a number of special advantages resulting from my construction. The placing of the oil-tank under water and at the bottom of the main tank insures its safety and also maintains the gasolene at a practically-even temperature at all seasons. From the same position of the oil-tank I am able to use the water-pressure for displacing and forcing the gasolene out of the tank into the measuring-tank, water entering the gasolene-tank to replace the oil forced out. This operation is under complete control by means of the cocks shown, so that the exact amount of gasolene required to make a given quantity of gas can be isolated from the main body. The gasolene is always confined in tanks or pipes and never handled in the open, so that it is safe to operate the machine at night with a light. The amount supplied to the carbureter can also be perfectly regulated, so that there is no danger of waste by evaporation or spilling. The isolation of a small and perfectly-regulated quantity of gasolene is a marked improvement as distinguished from apparatus involving evaporation and carbureting from the main body of oil. In the latter case the standard of the gasolene is reduced by evaporation. Further, in evaporation from a large body of liquid it soon becoms chilled, making subsequent evaporation imperfect. By my apparatus perfect gas is made without using heat. The gasolene being in such a thin stratum in the carbureter, the chilling effect is not noticeable on account of the short time required to change the plant. As only the required amount of gasolene is run into the carbureter each time and just before the air is admitted, there is no trouble from local evaporation, which would produce a waste of oil, excessive richness of gas, and smoky lights. Furthermore, the gas being made by producing a vacuum and the capacity of the bell which produces it being known, the exact quantity of air in cubic feet to be admitted can be determined relatively to the amount of oil admitted to the measuring-can, insuring complete evaporation and a standard gas, and the quantity of gasolene remaining in the storage-tank B is always definitely known.

I do not limit myself to details of construction herein described and shown in the drawings, as I desire to avail myself of such modifications and equivalents as fall properly within the spirit of my invention.

Having thus fully described my invention, what I claim as new, and desire to secure by Letters Patent, is—

1. In a gas-machine, a water-tank, an oil-tank immersed therein and accessible to water from the water-tank, an oil-supply pipe entering the oil-tank, whereby oil is delivered under pressure to said oil-tank, a valve for cutting off the supply of oil, and a carbureter; whereby water is displaced from the oil-tank by the admission of oil under pressure; and whereby also, upon the cessation of the supply of oil, the back pressure of water forces oil from said oil-tank to a point above the water-level.

2. In a gas-machine, a water-tank, an oil-tank immersed therein, a carbureter floating upon the body of water, means for supplying oil to the oil-tank, means for elevating oil from the oil-tank to a point above the carbureter, a pipe from such point to the carbureter, and an air-inlet pipe to the carbureter.

3. In a gas-machine, a water-tank, a carbureter comprising a plate or disk having a superficial flange arranged to form an air-passage, the said disk floating upon the water in the water-tank so that the said flange dips into the water which forms the bottom of said air-passage, means for supplying oil to said passage above the water, and means for forcing air through said passage above the oil therein.

4. In a gas-machine, a water-tank, a carbureter comprising a disk having an air-chamber which makes said disk buoyant and maintains it above the water on which it floats, a flange on such disk dipping into the body of water and forming in connection with the water-surface an oil-space and an air-passage and means for supplying oil and air to said space or passage.

5. In a gas-machine and in combination a water-tank, an oil-tank immersed therein, a carbureter supported by the water in the tank, an opening into the oil-tank to admit water thereto, an oil-pipe to said oil-tank, a measuring vessel located at a higher level than the carbureter and communicating with said oil-pipe, a pipe from the measuring vessel to the carbureter, controlling-valves in said pipes, and means for admitting air to the carbureter.

6. In a gas-machine and in combination an open-topped water-tank, an inverted tank or bell partially immersed therein and vertically movable, an oil-tank completely immersed therein and accessible to water from the water-tank, a carbureter supported by the body of water, a passage for oil connecting the oil-tank and the cabureter, an air-pipe leading to the carbureter, and means for moving the said bell; whereby, through water-pressure, acting on the oil in the oil-tank, oil is supplied to the carbureter, and by the raising of the bell air is drawn into the carbureter, the raised bell also forming a gas-holder.

7. In a gas-machine the combination with a tank containing a body of water, of a carbureter floating upon said body of water, an oil-tank immersed in said water below the carbureter, and connections between said oil-tank and carbureter.

8. In a gas-machine, a water-tank, a carbureter at the water-level in which oil is confined on the surface of the water, and a movable bell in the water-tank, having an air-inlet and a gas-outlet and communicating directly with the carbureter, whereby the ascent of the bell produces a vacuum or partial vacuum above the water-level and a storage-space for air drawn through the said carbureter.

9. In a gas-machine, a water-tank, an inverted tank or bell therein, a buoyant carbureter at the water-level, an air-inlet pipe connected to the carbureter, and a gas-outlet from the bell; the said bell being movable vertically, whereby when elevated it draws air through the carbureter, and when it descends forces gas through the gas-outlet.

10. In a gas-machine, a water-tank, a buoyant carbureter supported by the water therein, an inverted tank or bell partially immersed and vertically movable, an air-inlet pipe connected to the carbureter, a gas-outlet from the bell, and an automatic valve in the air-pipe, adapted to open to external pressure and to close to internal pressure; whereby air is drawn through the carbureter and into the bell by the elevation of said bell, and is forced through the gas-outlet by the descent of said bell.

11. In a gas-machine, the combination with a water-tank and with an oil-tank immersed therein and accessible to water, of a carbureter at the water-level, a measuring vessel above the water-level, an oil-supply pipe connected to the measuring vessel and to the oil-tank, and valves in said supply-pipe for controlling the movement of oil; whereby oil can be forced into said oil-tank and afterward elevated into said measuring vessel by water-pressure to afford a direct and limited supply for said carbureter.

12. In combination with a water-tank having a buoyant carbureter supported by the water therein, of an inverted open-bottomed tank partially immersed in the water, means for moving the same vertically whereby it forms a vacuum-chamber above the carbureter and communicating therewith, an air-inlet pipe communicating with the carbureter and an automatic valve in said pipe, adapted to open to the pressure of air entering, and to close to said back pressure from said vacuum-chamber.

13. In a gas-machine, the combination with a carbureter, of means for producing a combined vacuum-chamber and gas-holding chamber communicating with said carbureter, an air-inlet pipe, an automatic valve in said pipe opening to external air-pressure and closing to back pressure from the said chamber, and external means by which said valve can be operated by hand, substantially as and for the purpose set forth.

14. In a gas-machine, an open-topped water-tank, an inverted tank within the same and vertically movable, a stationary pipe within the water-tank, an air-inlet pipe carried by the inverted tank and entering the said stationary pipe, a carbureter in communication with the said stationary pipe, and means for moving said inverted tank.

In testimony whereof I have affixed my signature, in presence of two witnesses, this 13th day of October, 1899.

JOSEPH E. SHEARER.

Witnesses:
C. H. PORTER,
A. J. MCLENAN.